United States Patent [19]

Tamura et al.

[11] 4,435,375
[45] Mar. 6, 1984

[54] METHOD FOR PRODUCING A CARBON FILAMENT AND DERIVATIVES THEREOF

[75] Inventors: Shohei Tamura, c/o Tohdai-shokuin-shukusha, 8, Komaba 4-chome, Meguro-ku, Tokyo; Mizuka Sano, Koganei; Hiroo Inokuchi, Okazaki; Koshiro Toriumi, Okazaki; Naoki Sato, Okazaki, all of Japan

[73] Assignee: Shohei Tamura, Tokyo, Japan

[21] Appl. No.: 299,604

[22] Filed: Sep. 4, 1981

[30] Foreign Application Priority Data

Mar. 27, 1981 [JP] Japan .................................. 56-44956

[51] Int. Cl.³ .................... C01B 31/30; C01B 31/04; D01F 9/12
[52] U.S. Cl. .............................. 423/439; 423/447.1; 423/447.2; 423/447.3; 423/448; 252/502; 252/503
[58] Field of Search ............... 423/447.1, 447.2, 447.4, 423/461, 448, 447.3, 439; 204/173; 156/600, DIG. 68, DIG. 112; 252/502, 503

[56] References Cited

U.S. PATENT DOCUMENTS 2,957,756 10/1960 Bacon ................................ 423/447.2
3,848,739 11/1974 Fagan .................................. 423/461

FOREIGN PATENT DOCUMENTS 1221424 2/1971 United Kingdom ............. 423/447.1

OTHER PUBLICATIONS

J. Cryst. Growth, 16, 71 (1972).
Carbon, 10, 757 (1972).
Carbon, 14, 86 (1976).
J. Appl. Phys., 31, 283 (1960).
J. Chem. Phys., 72, 3840 (1980).

Primary Examiner—Edward J. Meros
Assistant Examiner—Steven Capella
Attorney, Agent, or Firm—Finnegan, Henderson, Farabow, Garrett & Dunner

[57] ABSTRACT

A novel type of carbon filaments grow from a purified graphite material when the purified graphite material is heated in a plasma. The carbon filaments thus obtained can be converted into softer graphite filaments. Both the carbon filaments and the graphite filaments as such are extremely useful due to their excellent mechanical strengths. In addition, from each of them, intercalation compounds with an alkali metal can be obtained, which are useful not only as a highly conductive material but also as a catalyst for various reactions.

7 Claims, 6 Drawing Figures

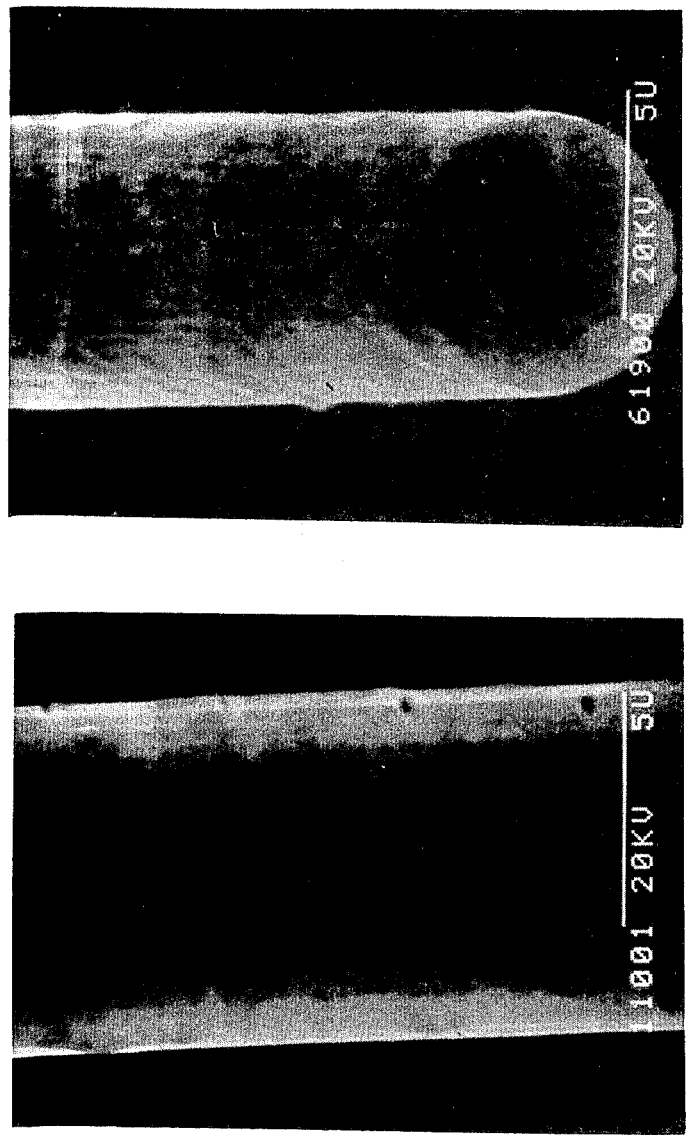

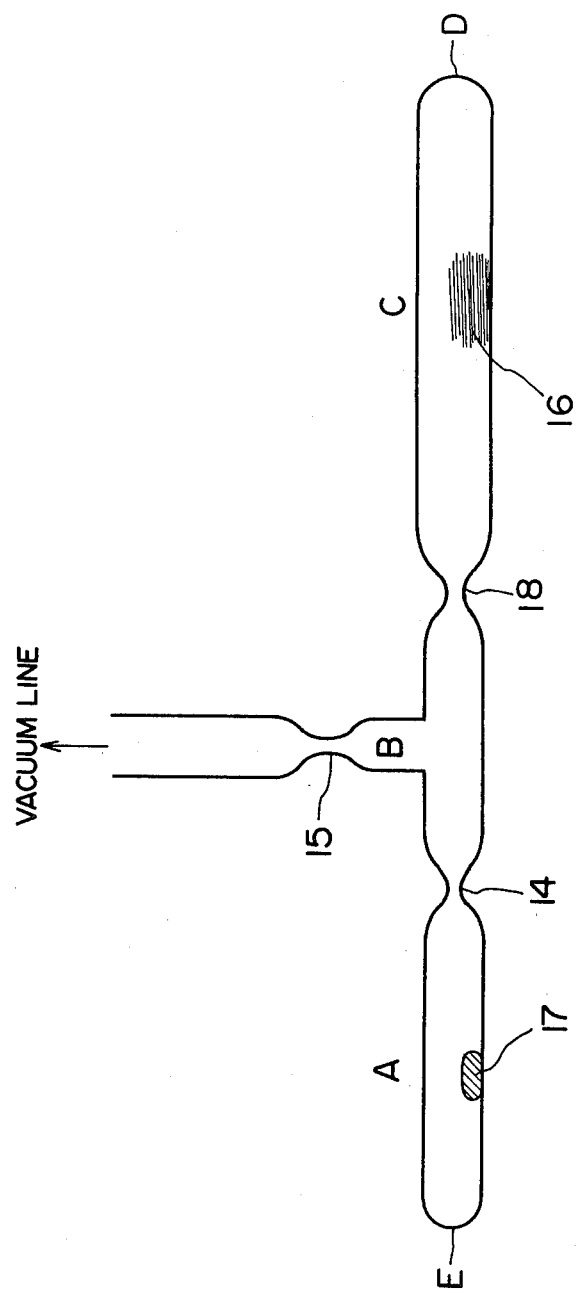

METHOD FOR PRODUCING A CARBON FILAMENT AND DERIVATIVES THEREOF

This invention relates to a method for producing a carbon filament and derivatives thereof. More particularly, the present invention is concerned with the production of a new type of carbon filament by heating a purified graphite material in a plasma, and with the production of a graphite filament by heating the above-mentioned carbon filament at a high temperature in the atmosphere of an inert gas. The present invention is also concerned with the production of a carbon filament- or graphite filament-intercalation compound intercalated with an alkali metal such as potassium, rubidium or cesium.

As a result of the investigations by the present inventors, it has unexpectedly, surprisingly been found that when a graphite material purified by the treatment with a mineral acid, e.g. agua regia, and/or halogen gas, e.g. chlorine gas, is heated in a plasma, e.g. argon plasma, generated in a d.c. arc, non-branched carbon filaments each having a length of about 20 cm and a diameter of about 7 $\mu$m grow from the purified graphite material in the form of a cross-free bundle. Further, it has also been found that the carbon filaments thus obtained can be converted into softer graphite filaments by subjecting the carbon filaments to heat treatment at, for example, 3,000° C. in a graphite resistance furnace or to heat treatment at, for example, 3,400° C. in a high frequency induction furnace, and that these two kinds of filaments, namely, carbon filaments and graphite filaments form respective intercalation compounds with an alkali metal, for example, K, Rb or Cs. The present invention has been made, based on such novel findings.

With respect to the production of carbonaceous filaments or fibers, there have heretofore been proposed a method in which an organic precursor filament is carbonized; a method in which a carbon-rich gas such as carbon monoxide, methane, heptane or benzene is pyrolyzed in the presence of a solid material; and the like. For example, according to the method of Haanstra et al. [J. Cryst. Growth, 16, 71 (1972)], carbon monoxide is pyrolyzed on a $\beta$-SiC crystal to obtain 3–6 $\mu$m-diametered, about 1 mm-long carbon columns having a cone-helical structure. Further, according to the method of Koyama [Carbon, 10, 757 (1972)], a mixture of benzene and hydrogen is pyrolyzed on a graphite block abraded by an emery paper to obtain carbon fibers of a cylindrical scroll structure.

However, no method is known of producing new type highly grown carbon filaments by the use of a plasma.

Accordingly, it is an object of the present invention to provide a method for producing a novel carbon filament from a graphite material.

It is another object of the present invention to provide a method for producing a new type of graphite filament from the above novel carbon filament.

It is a further object of the present invention to provide a method for producing an intercalation compound of the carbon filament or graphite filament with an alkali metal.

The foregoing and other objects, features and advantages of the present invention will be apparent to those skilled in the art from the following detailed description taken in connection with the accompanying drawings in which:

FIG. 3 is a scanning electron photomicrograph ($\times$8,000) of the surface of the carbon filament obtained by the method of the present invention;

FIG. 4 is a scanning electron photomicrograph ($\times$8,000) of the longitudinal cross-section of the graphite filament obtained by the method of the present invention;

FIG. 6 is a diagrammatic view of one form of an apparatus used for producing an intercalation compound of the carbon filament or graphite filament with an alkali metal.

Essentially, in one aspect of the present invention, there is provided a method for producing a carbon filament which comprises purifying a graphite material and heating the resulting purified graphite material in a plasma having an electron temperature of at least 3,400° C.

In another aspect of the present invention, there is provided a method for producing a graphite filament which comprises purifying a graphite material, heating the resulting purified graphite material in a plasma having an electron temperature of at least 3,400° C. to form a carbon filament, and subjecting the carbon filament to heat treatment at a temperature of at least 2,500° C. to effect graphitization thereof.

Now, particularly with respect to the production of a carbon filament and a graphite filament, the present invention will be explained with reference to the accompanying drawings.

Figure 1:
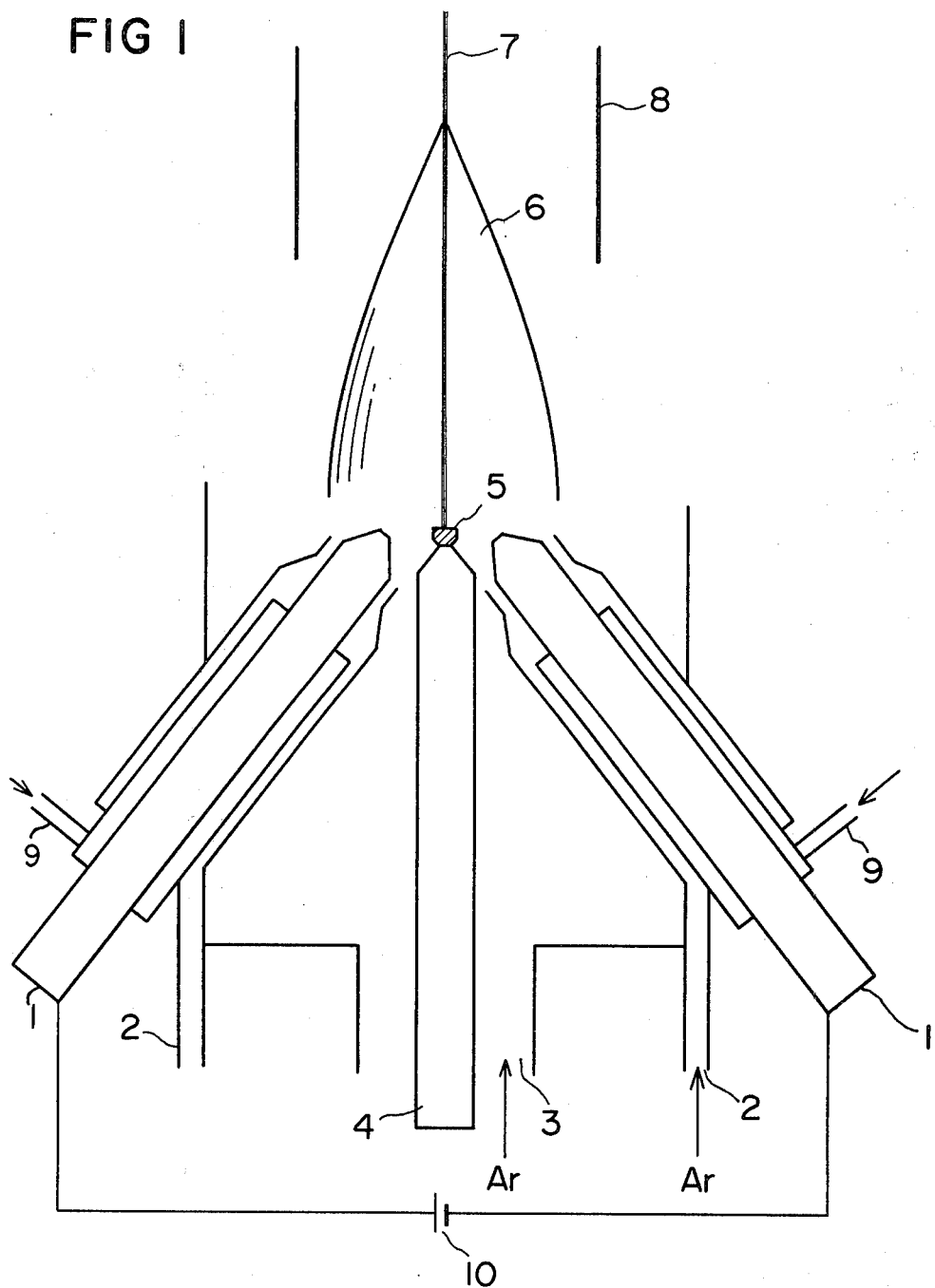
FIG. 1 is a diagrammatic view of one form of an apparatus used for producing a carbon filament according to the present invention.

In FIG. 1, there is shown a diagrammatic view of an apparatus used for producing a carbon filament according to the method of the present invention. Numeral 1 designates electrodes, numeral 2 inlets for neutral gas, numeral 3 an inlet for neutral gas, numeral 4 a support, numeral 5 a purified graphite material, numeral 6 a plasma, numeral 7 carbon filaments in the form of a bundle, numeral 8 a quartz tube, numeral 9 an inlet and outlet for a cooling medium and numeral 10 a power source. In FIG. 1, argon gas is shown as an example of the neutral gas.

In practicing the method of the present invention, for example, a piece of grafoil GTA (tradename of a graphite product produced and sold by Union Carbide Corporation, U.S.A.) is purified and the purified grafoil 5 is supported by a support 4 made of a graphite rod between a pair of graphite rod electrodes 1. By continuously flowing a neutral gas at a rate of, for example, about 3 liters/min totally from inlets 2 and 3 toward the purified grafoil 5, there is generated a plasma in a d.c. arc by the action of the pair of electrodes 1. The plasma flame tends to be inclined in the direction of the stream of the neutral gas. In FIG. 1, however, there is provided a quartz tube 8 above the support 4 and, hence, the plasma flame extends along the inner wall of the quartz tube 8 to form a long plasma flame.

When the electron temperature of the plasma reaches about 3,400° C., hair-like carbon filaments begin to grow, in the form of a bundle, from the purified graphite supported by the support 4. The mechanism of the growth of carbon filaments is not fully elucidated yet. Apparently, however, carbon filaments seem to grow up gradually, in the form of a bundle, from the purified graphite material and, the rate of growth of carbon filaments is so high as to be able to be visually observed, that is, for example, 1 cm/min. According to the study of the present inventors, as depicted in FIG. 1, the bundle of carbon fibers starts to grow in the plasma and continues to grow along the stream of the neutral gas within the plasma and further along the inner wall of the quartz tube 8 until the purified graphite 5 on the support 4 is completely consumed, finally to have a length of, for example, about 20 cm.

As the neutral gas, there can be employed an inert gas such as argon gas or the like. The temperature of the plasma may be at least 3,400° C., preferably 4,000° C. or more, up to 13,000° C. at maximum in terms of electron temperature (which is defined as a temperature at which ideal gas molecules would have an average kinetic energy equal to that of electrons in the plasma, and is determined by the kinetic energy of the electrons). The electron temperature of the plasma was determined from the line width of the emission spectrum according to a customary method [reference may be made to "Hoden Handbook (Discharge Handbook)" page 326, published by Denki Gakkai, Japan (1973)]. The rate of growth of carbon filaments on the purified graphite material varies depending on the kind and shape of a plasma generating apparatus, the electron temperature of a plasma, the amount of a neutral gas fed, the degree of purification of a graphite material and the like. For example, when the apparatus of FIG. 1 is used and the amount of a neutral gas and the electron temperature are 3 liters/min and 5,000° C., respectively, carbon filaments grow at a rate of about 1 cm/min. The pressure of the neutral gas employed is not particulary critical and, in general, sufficiently good results can be obtained by the use of a neutral gas under a pressure of about 1 atm.

In the present invention, it is indispensable to employ a graphite material as a raw material. As examples of the graphite material, there can be mentioned natural graphite, an ordinary artificial graphite obtained by subjecting a graphitizable carbon material such as petroleum coke or the like to heat treatment for graphitization thereof, and pyrolytic graphite. Further, it is requisite in the method of the present invention to purify a graphite material so that the mineral impurities content of the graphite material is reduced to an extent as low as possible. For example, by purifying grafoil GTA there were prepared two sample pieces of graphite having iron contents of 80 ppm and 8 ppm, respectively. The method of the present invention was practiced using the two sample pieces of graphite thus prepared to examine growth of carbon filaments. Even with the sample piece of graphite having an iron content of 80 ppm, sufficient growth of carbon filaments was observed but the rate of the growth was small. With the sample piece of graphite having an iron content of 8 ppm, there was observed a great rate of growth of carbon filaments. It is preferred that a graphite material be purified to have a mineral impurities content of 80 ppm or less, preferably 50 ppm or less (a graphite material generally contains iron, calcium, sodium, magnesium, boron, nickel, cobalt and the like, but most of the impurities, if any, remaining in the purified graphite is iron).

In order to purify a graphite material, there may be employed customary various kinds of purifying methods. In the present invention, however, high degree of purification of a graphite material is particularly necessary. For this reason, there may preferably be employed a method in which a graphite material is washed with at least one mineral acid selected from hydrochloric acid, nitric acid, hydrofluoric acid, perchloric acid, aqua regia and the like. Of them, aqua regia is particularly preferred. More preferably, there may be employed a method in which a graphite material is subjected to a preliminary purification by washing it with such a mineral acid as mentioned above (or not subjected to such a preliminary purification) and is contacted with a halogen gas such as chlorine gas while heating the graphite material at high temperatures. In this instance, it is preferred that the halogen gas be used together with steam. Alternatively, to purify a graphite material, the contact of a graphite material with vapor of a hydrogen halide such as hydrogen chloride may also be adopted. It is most preferred to wash a graphite material with a mineral acid, particularly aqua regia, and then contact the washed graphite with a halogen gas or vapor of hydrogen halide while heating the washed graphite at a temperature of about 200° C. to about 1,500° C. The above-mentioned purifying operation may be repeated desired times according to need.

The quantitative analysis of mineral impurities in a graphite material may be done according to any of known analytical methods. For example, there may preferably be employed a method in which the analysis is conducted by means of an X-ray fluorescence analyser (for example, "Geigerflex" produced and sold by Rigaku Denki K.K., Japan) in comparison with known sample graphites in which known amounts of mineral impurities (e.g., iron chloride as iron values) are contained (this method was employed in Examples as given later). Alternatively, there may be employed a method in which the quantitative analysis of mineral impurities is conducted by atomic-absorption spectroscopy (e.g. "Model AA-500" produced and sold by Yanagimoto K.K., Japan).

A graphite filament is obtained by subjecting the above-mentioned carbon filament to heat treatment at a temperature of at least 2,500° C. in an atmosphere of inert gas such as argon, helium or the like. Illustratively stated, according to the experiments of the present inventors, the carbon filament obtained according to the method of the present invention is heated for graphitization thereof in a graphite resistance furnace or a high frequency induction furnace to obtain a very soft graphite filament as compared with the conventional graphite filaments. The temperature for the heat treatment of the carbon filament may preferably be 2,800° C. or more, more preferably 3,000° C. or more.

In still another aspect of the present invention, there is provided a method for producing an intercalation compound of a carbon filament with an alkali metal which comprises purifying a graphite material, heating the resulting purified graphite material in a plasma having an electron temperature of at least 3,400° C. to form a carbon filament, and reacting the carbon filament with an alkali metal.

In a further aspect of the present invention, there is provided a method for producing an intercalation compound of a graphite filament with an alkali metal which comprises purifying a graphite material, heating the resulting purified graphite material in a plasma having an electron temperature of at least 3,400° C. to form a carbon filament, subjecting the carbon filament to heat treatment at a temperature of at least 2,500° C. to obtain a graphite filament, and reacting the graphite filament with an alkali metal.

With respect to an intercalation compound of graphite with an alkali metal, various kinds of studies have heretofore been made on the kind or shape of graphite as a raw material, the production process of the desired intercalation compounds, characteristic properties such as an electrical conductivity, etc. ["Seminar on Properties of Metals" 2, 245–259 (1977); and "Carbon" 79, 106 (1978)]. However, hardly any reports have been found on studies of the production of intercalation compounds of a graphite filament as well as a carbon filament and properties of such intercalation compounds. The reason for this is believed to reside in that even if the formation of an intercalation compound of a carbon filament or a graphite filament with an alkali metal is intended, the reaction between a carbon filament or a graphite filament does hardly proceed.

However, the present inventors have unexpectedly found that both the carbon filament and the graphite filament produced according to the method of the present invention can be easily reacted with an alkali metal such as K, Rb or Cs to form their respective intercalation compounds.

An intercalation compound of a carbon filament or a graphite filament with an alkali metal can be obtained by reacting the above-mentioned carbon filament or graphite filament with an alkali metal in accordance with various methods. For example, it is advantageous to employ a process which is known as "dual furnace process" [J. Phys. D 1, 291 (1968)]. By this process, there can be obtained an intercalation compound of a desired stage. Further, according to a dual furnace process, by adding a fresh carbon filament or a fresh graphite filament to the once formed intercalation compound of a certain stage (e.g., 1st stage) followed by heat treatment, there can be obtained an intercalation compound of a different stage (e.g., 2nd stage or 3rd stage). The dual furnace process is characterized in that when an alkali metal and a carbon filament or a graphite filament are heated separately so that the temperature of the alkali metal is different from that of the carbon filament or the graphite filament, there is formed an intercalation compound of a desired stage according to the value of temperature difference. For example, in case potassium is used as an alkali metal, when the temperature ($t_1$) of the potassium is maintained at 250° C. and the temperature ($t_2$) of a graphite filament is so maintained that $t_2-t_1$ is less than 100° C., there is obtained a 1st stage intercalation compound. When $t_2-t_1$ is 100° to 200° C., there is obtained a 2nd stage intercalation compound. Such reaction conditions vary depending on factors such as the kind of an alkali metal and the kind of a carbon filament or a graphite filament and, therefore, should be appropriately determined according to the above-mentioned factors and a desired stage of intercalation compound.

As different from the reaction between an alkali metal and the conventional graphite filament obtained by carbonizing an organic filament such as a polyacrylonitrile filament, the graphite filament obtained according to the present invention can easily give an intercalation compound thereof with an alkali metal such as K, Rb or Cs by the smooth reaction therebetween. As a result, there is obtained, for example, brilliant golden or blue intercalation compounds of the graphite filament. For example, when the graphite filament obtained according to the present invention is put together with metal cesium in a vacuum tube, the gas phase reaction smoothly proceeds even at room temperature to give a filament of a golden color inherent of the 1st stage intercalation compound. An apparatus for practicing a dual furnace process is illustrated in FIG. 6.

With respect to the carbon filament, graphite filament and alkali metal-intercalated intercalation compounds of the carbon filament and graphite filament, the structures were examined by X-ray diffraction, electron diffraction, scanning electron microscopy, laser Raman scattering (induced by argon ion laser radiation, excitation wavelength of 488 nm) [A. Oberlin and G. Terrière: J. Microscopie 14, 1 (1972); 21 301 (1974)]. The resitivity was measured in the range of 4.2–300K by the 4-point d.c.-bridge method. The magnetoresistance was measured at 1.7K and 4.2K in the magnetic field of from 0 to 120 kOe by means of an Intermagnetics MIDIBRUTE 120 superconducting magnet. The intercalation compound with an alkali metal is produced from a single filament fixed on a quartz plate by gas phase reaction, and while leaving the thus produced filament intercalated with an alkali metal as it is, the resistivity was measured by flowing a predetermined current of less than 1 $\mu$A to the filament according to the 4-probe d.c. method (Sano and Inokuchi: Chem. Lett., 1979, 405).

Each of the filaments is circular in cross-section and has a smooth surface. The diameter of the filament is nearly constant over its entire length. When the filament is irradiated with X-ray in the direction perpendicular to the filament axis, there appear diffraction spots lying perpendicular to the filament axis, which spots correspond to (00l) of graphite, l=2,4 and 6. From this, it is understood that the graphite type crystallites constituting the carbon filament are so arranged that the c-axis is perpendicular to the filament axis.

Both the X-ray diffraction patterns of graphite 30 and graphite 34 (which have been obtained by subjecting the present carbon filament to heat treatment at 3,000° C. and 3,400° C., respectively) show sharp spots. On the other hand, the X-ray diffraction pattern of the carbon filament shows arc-like broad diffraction spots.

The Raman scattering gives a spectrum of a sharp and high intensity peak at 1582 cm$^{-1}$ inherent of graphite for the graphite filament, accompanied by a tiny and broad peak at 1360 cm$^{-1}$. This spectrum is quite similar to that of highly oriented pyrolytic graphite (HOPG). On the other hand, with respect to the carbon filament, the Raman scattering gives two broad peaks around 1590 cm$^{-1}$ and 1370 cm$^{-1}$, respectively.

In order to know whether the layers in the graphite type crystallites in the filament obtained according to the present invention are concentrically arranged about the filament axis or are arranged radially of the filament axis, the filament was irradiated with thin electron beam (50 keV) of 1 $\mu$m in diameter so as for the electron beam to pass in the direction perpendicular to the filament axis and pass only on the surface of the filament. In such a manner, the electron diffraction pattern due only to the surface portion of the filament was examined. As a result, it has been found that the layers in the graphite type crystallites in the surface portion of the filament are arranged in parallel to the surface of the filament. The electron diffraction pattern did not undergo any change even after rotation of the filament about its axis. As is apparent from the above results, the filament has such a structure that the c-axes of the graphite type crystallites are perpendicular to the filament axis and the layers of the graphite type crystallites are concentrically arranged about the filament axis. Further, the structure of the filament was examined by means of dark-field electron microscopy with a 1000 keV electron beam. The filament was found to be composed of three parts: an outer sheath, an inner sheath and a core. The outer sheath exhibited a brighter (002) dark-field image and a darker (100) dark-field image than the inner sheath did. The core did not exhibit any electron diffraction pattern. From these results, it is concluded that the outer sheath consists mainly of circumferentially oriented graphitic layers, the inner sheath consists mainly of radially oriented graphitic layers, and the core probably consists of randomly distributed minute crystallites or amorphous material. The above-mentioned characteristic structure comprising an outer sheath, an inner sheath and a core is diagrammatically illustrated in FIG. 2. In this connection, it is noted that the graphite filament exhibits sharp X-ray diffraction spots and the great intensity contrast between the dark field (002) or (100) electron micrograph of the outer sheath and that of the inner sheath as compared with those found with respect to the carbon filament. This substantiates the high degree of orientation of crystallites in the graphite filament.

The longitudinal resistivities are 1300, 660 and 610 $\mu\Omega$cm respectively for filaments of carbon, graphite 30 and graphite 34 at 300K, and increase monotonically with decreasing temperature down to 4.2K. The ratios of the resistivities at 4.2K to those at 300K ($\rho 4.2/\rho 300$) are 1.13, 1.45 and 1.43, respectively. The resistivity of the carbon filament is reduced by half by heating it at 3,000° C., but no difference is observed in resistivity between the heat treatment at 3,000° C. and that at 3,400° C.

The transverse magnetoresistance was found to be positive for the carbon filament and to be negative for the graphite 30 and the graphite 34 at 1.7K and 4.2K in the entire range (0–120 kOe) of the magnetic field applied in the direction perpendicular to the filament axis. Rotation of each single filament about the filament axis did not change the magnetoresistance.

As described before, by controlling a temperature difference between the graphite filament and an alkali metal, there can be obtained a 1st stage intercalation compound of golden color and a 2nd stage intercalation compound of blue color. The X-ray diffraction of a golden 1st stage graphite filament-Cs intercalation compound gives a sharp spot lying perpendicularly to the filament axis from which spot there is obtained an interlayer spacing of 5.96 Å and a spot lying in parallel to the filament axis from which spot there is obtained a Cs-Cs atomic distance of 4.92 Å. The above interlayer spacing and atomic distance are well in agreement with those of a 1st stage HOPG-Cs intercalation compound.

The graphite filament intercalated with K, Rb, or Cs was found to show a greatly reduced longitudinal resistivity as compared with the graphite filament, that is in the range of 23–25 $\mu\Omega$cm at 300K for the 1st stage compounds, and in the range of 28–30 $\mu\Omega$cm at 300K for the 2nd stage compounds. Moreover, the above intercalation compound showed such a metallic character that the resistivity decreases with decreasing temperature. No difference in resistivity value was found among the potassium, rubidium and cesium compounds.

The resistivity of the 1st stage intercalation compound is lower than that of the 2nd stage compound.

On the other hand, with respect to an intercalation compound of the carbon filament with an alkali metal, the intercalation compound obtained by controlling the temperature difference between the carbon filament and an alkali metal within 50° C. (the color of a piece of grafoil inserted as an indicator in a dual furnace became reddish-brown) showed a resistivity of about 250 $\mu\Omega$cm at 300K, and the intercalation compound obtained by controlling the temperature difference within 130° C. showed a resistivity of 550 $\mu\Omega$cm at 300K. As different from the intercalation compounds of the graphite filament with an alkali metal, the compounds of the carbon filament with an alkali metal do not undergo noticeable change in color as compared with the carbon filament, and do undergo increase in resistivity with decreasing temperature.

The carbon filament and graphite filament obtained according to the present invention are extremely excellent in physical properties as compared with the conventional carbon filament and graphite filament. The remarkable excellent property is such that, despite the fact that the carbon content of filaments is substantially 100%, when the filaments are forcibly bent by hand, they are only smoothly bent without causing any breakage. For this reason, the carbon filament and graphite filament are useful not only in the field where the conventional ones are used, but also in the special field where the conventional organic filaments having high Young's modulus, for example, KEVLAR (tradename of an organic filament product produced by Du Pont, U.S.A) are used. Moreover, the intercalation compounds of the carbon filament or graphite filament with an alkali metal are also useful not only as a filamentary electroconductive material but also as a catalyst for various reactions such as adsorption of hydrogen and its related reactions, reactions of other various compounds, etc.

The present invention will be illustrated in more detail with reference to the following Examples, which should not be construed to be limiting the scope of the present invention.

EXAMPLE 1

A piece of grafoil GTA was immersed in aqua regia for 24 hours. After the immersion, the grafoil assuming paste was taken out and washed with water. The washed grafoil was then subjected to heat treatment at 800° C. for 10 minutes in a wet chlorine gas atmosphere. The heat treatment was repeated three times. The grafoil thus purified had an iron content of 8 ppm.

Using an apparatus as shown in FIG. 1, about 20 mg of the purified grafoil 5 was securely put on a support 4 disposed between a pair of carbon rod electrodes 1 as depicted in FIG. 1, and heated in an argon plasma generated in a d.c. arc (electric current: 30A). The temperature of the plasma was 5,000° C. in terms of electron temperature. Argon gas was flowed at a rate of 0.5 liter/min from inlets 2 and at a rate of 2 liters/min from an inlet 3.

When the electron temperature of the plasma reached about 3,400° C., hair-like carbon filaments began to grow, in the form of a bundle, from the purified graphite supported by the support 4. The rate of growth of carbon filaments was as high as 1 cm/min and the growth of carbon filaments could be visually observed. The bundle of carbon fibers continued to grow in the plasma along the center of the stream thereof until the purified graphite 5 on the support 4 is completely consumed. Each of the carbon filaments thus obtained was circular in cross-section and had a smooth surface. The diameter of the filament was about 7 μm and nearly constant over its entire length. The length was about 20 cm. Each of the carbon filaments was non-branched, and the bundle of carbon filament was cross-free. The carbon filament had a Young's modulus of $2.1-2.2 \times 10^{11}$ Pascal and a specific gravity of $1.919 \times 10^3$ kg/m$^3$. The scanning electron photomicrograph of the surface of the carbon filament (taken by "Model S-450" produced and sold by Hitachi Ltd., Japan) is shown in FIG. 3.

Figure 2:
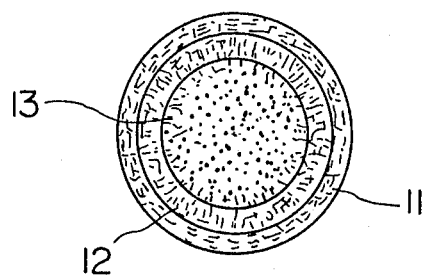
FIG. 2 is a diagrammatic enlarged cross-sectional view of the filaments obtained by the method of the present invention, illustrating the internal structure of the filaments.

With respect to the carbon filament thus obtained, the structure was examined by X-ray diffraction, electron diffraction, scanning electron microscopy, laser Raman scattering (induced by argon ion laser radiation, excitation wavelength of 488 nm). As a result, it was found that the filament was composed of three parts, namely, an outer sheath 11, an inner sheath 12 and a core 13 as depicted in FIG. 2. The outer sheath, about 0.7 μm thick, consists mainly of circumferentially oriented graphitic layers, and the inner sheath, about 1.4 μm thick, consists mainly of radially oriented graphitic layers. The layers in graphite type crystallites in both the outer and inner sheaths were not sufficiently oriented as compared with those of a graphite filament obtained by subjecting the carbon filament to heat treatment at least 2,500° C. The core, about 2.8 μm in diameter, probably consists of randomly distributed minute crystallites or amorphous material, because it did not show any electron diffraction pattern.

EXAMPLE 2

Substantially the same procedures as in Example 1 were repeated except that grafoil was purified only by immersing it in aqua regia for 24 hours and the purified grafoil had an iron content of 80 ppm. There were obtained carbon filaments each having a length of about 0.2 cm and a diameter of about 1–5 μm.

COMPARATIVE EXAMPLE 1

Substantially the same procedures as in Example 1 were repeated except that unpurified grafoil (iron content = 1300±300 ppm) as such was heated in the argon plasma. No carbon filament grew.

EXAMPLE 3

Figure 5:
FIG. 5 is a scanning electron photomicrograph ($\times$8,000) of the surface of the graphite filament obtained by the method of the present invention.

The carbon filament obtained in Example 1 was securely put in a graphite resistance furnace and subjected to heat treatment at 3,000° C. for 60 minutes in argon gas under a pressure of 0.5 kg/cm$^2$ to obtain a graphite filament. The graphite filament thus obtained became softer than the carbon filament, but had, on its surface, convex and concave portions or fibrillar portions along the filament axis as seen from FIGS. 4–5. The Young's modulus of the graphite filament was $0.32 \times 10^{11}$ Pascal.

EXAMPLE 4

The carbon filament obtained in Example 1 was securely put in a furnace tube of a high frequency induction furnace (high temperature, high pressure type single crystal growing furnace "Model ADL" produced and sold by Kokusai Denki K.K., Japan). The coil portion in the furnace was moved at a rate of 40 cm/hr so that the heat treatment was conducted along the length of the carbon filament. The temperature of heat treatment was 3,400° C., and the average time of heat treatment was about 1 minute. As the atmosphere, helium gas was used under a pressure of 13 kg/cm$^2$. The graphite filament thus obtained became softer than the carbon filament. The appearance of the surface of the graphite filament was substantially the same as that of the graphite filament obtained in Example 3.

EXAMPLE 5

As shown in FIG. 6, a pyrex glass 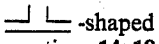-shaped open tube was molten, at its intermediate portions 14, 18 and 15, to make those portions narrow. After graphite filaments (Ex. 3) 16 were put in one tube portion C, the tube portion C was sealed at D. A metal of an alkali metal 17 (cesium) was put in the opposite tube portion A and the tube portion A was then sealed at E. The tube portion A was made high vacuum ($10^{-3}$–$10^{-5}$ mmHg) by means of a diffusion pump via a vacuum line and then heated to 200° C. so that cesium was charged in a chamber portion B by vacuum evaporation. Thereafter, the narrow portions 14 and 15 were sealed and cut while keeping the inner portions in vacuum.

The tube portion C (graphite filament side) and the chamber portion B (cesium side) which were connected with each other through the narrow portion 18 were put in a heating furnace. The heating furnace had two independent heating portions whose temperatures were able to be adjusted to different temperatures. By utilizing these two independent heating portions, the graphite filament side was heated at 240° C. while the cesium side was heated at 230° C., and the reaction was allowed to proceed for 20 hours. After completion of the reaction, the pyrex glass tube composed of the tube portion C and the chamber portion B was taken out of the heating furnace and cooled. The color of graphite filaments changed from black to brilliant golden color which is characteristic of a 1st stage graphite filament-alkali metal intercalation compound. This proved the formation of a 1st stage intercalation compound by the reaction of the graphite filament with cesium.

The X-ray diffraction of the golden 1st stage graphite filament-Cs intercalation compound gave a sharp spot lying perpendicularly to the filament axis from which spot there was obtained an interlayer spacing of 5.96 Å and a spot lying in parallel to the filament axis from which spot there was obtained a Cs-Cs atomic distance of 4.92 Å. The above interlayer spacing and atomic distance were well in agreement with those of a 1st stage HOPG-Cs intercalation compound.

EXAMPLE 6

Substantially the same procedures as in Example 5 were repeated except that the temperatures of the cesium side and the graphite filament side were 170° C. and 410° C., respectively and the reaction time was 40 hours. There was obtained a 2nd stage graphite filament-Cs intercalation compound having a blue color inherent thereof. The lattice constant of the product was 26.3 Å and in agreement with that of a 2nd stage HOPG-Cs intercalation compound.

EXAMPLES 7 and 8

Substantially the same procedures as in Example 5 were repeated except that Rb or K was used in place of Cs. In any case of Rb and K, there was obtained a 1st stage graphite filament intercalation compound. With respect to the Rb intercalation compound, the interlayer spacing was 5.62 Å and the Rb-Rb distance was 4.92 Å, both being in agreement with those of a 1st stage HOPG-Rb intercalation compound. With respect to the K intercalation compound, the interlayer spacing was 5.40 Å and the K-K distance was 4.92 Å, both being in agreement with those of a 1st HOPG-K intercalation compound.

EXAMPLE 9

Substantially the same procedures as in Example 5 were repeated except that carbon filaments (Ex. 1) were used in place of the graphite filament and that the temperatures of the cesium side and the carbon filament side were 230° C. and 240° C., respectively and the reaction time was 48 hours. There was obtained a 2nd stage carbon filament-Cs intercalation compound having a reduced resistivity, 250 $\mu\Omega$cm, as compared with that of the carbon filament, 1,300 $\mu\Omega$cm.

EXAMPLE 10

Substantially the same procedures as in Example 9 were repeated except that each of Rb and K was independently used in place of Cs and that the temperatures of the carbon filament side and the metal side were respectively 410° C. and 170° C. for Rb and were respectively 380° C. and 250° C. for K. There were obtained a 2nd stage carbon filament-Rb intercalation compound and a 2nd stage carbon filament-K intercalation compound. They had a reduced resistivity, 550 $\mu\Omega$cm, as compared with that of the carbon filament, 1,300 $\mu\Omega$cm.

What is claimed is:

1. A method for producing a graphite filament which comprises purifying a graphite material, heating the resulting purified graphite material in a plasma having an electron temperature of at least 3,400° C. under a pressure of about 1 atm. to form a carbon filament, then subjecting the carbon filament to heat treatment at a temperature of at least 2,500° C. to effect graphitization thereof.

2. A method for producing an intercalation compound of a carbon filament with an alkaline metal which comprises purifying a graphite material, heating the resulting purified graphite material in a plasma having an electron temperature of at least 3,400° C. under a pressure of about 1 atm. to form a carbon filament, and reacting the carbon filament with an alkaline metal.

3. A method for producing an intercalation compound of a graphite filament with an alkaline metal which comprises purifying a graphite material, heating the resulting purified graphite material in a plasma having an electron temperature of at least 3,400° C. under a pressure of about 1 atm. to form a carbon filament, subjecting the carbon filament to heat treatment at a temperature of at least 2,500° C. to obtain a graphite filament in reacting the graphite filament with an alkaline metal.

4. A method for producing a carbon filament which comprises purifying a graphite material and heating the resulting purified graphite material in a plasma having an electron temperature of at least 3,400° C. under a pressure of about 1 atm.

5. A method for producing a carbon filament which comprises purifying a graphite material and heating the resulting purified graphite material in a plasma having an electron temperature of at least 3,400° C. under a pressure of about 1 atm., wherein said purified graphite material has an iron content of about 80 ppm or less.

6. A method for producing a carbon filament which comprises purifying a graphite material and heating said purified graphite material in a plasma having an electron temperature of at least 3,400° C., to form a carbon filament therefrom, said purified graphite material being introduced into said plasma separately from any electrode used to produce said plasma.

7. A method for producing a carbon filament which comprises purifying a graphite material and heating the resulting purified graphite material in a plasma having an electron temperature of at least 3,400° C. under a pressure of about 1 atm., said purified graphite material from which said filament is produced not forming part of any electrode used to produce said plasma.

* * * * *